United States Patent
Koui

(10) Patent No.: US 9,390,731 B2
(45) Date of Patent: Jul. 12, 2016

(54) MAGNETIC RECORDING HEAD AND MAGNETIC RECORDING APPARATUS

(71) Applicant: Kabushiki Kaisha Toshiba, Minato-ku (JP)

(72) Inventor: Katsuhiko Koui, Yokohama (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 0 days.

(21) Appl. No.: 14/329,174

(22) Filed: Jul. 11, 2014

(65) Prior Publication Data

US 2015/0310881 A1  Oct. 29, 2015

(30) Foreign Application Priority Data

Apr. 25, 2014  (JP) ................. 2014-092129

(51) Int. Cl.
   G11B 5/31 (2006.01)
   G11B 5/00 (2006.01)

(52) U.S. Cl.
   CPC .......... G11B 5/314 (2013.01); *G11B 2005/001* (2013.01); *G11B 2005/0024* (2013.01)

(58) Field of Classification Search
   None
   See application file for complete search history.

(56) References Cited

U.S. PATENT DOCUMENTS

| | | | | |
|---|---|---|---|---|
| 6,785,092 B2* | 8/2004 | Covington | ............. | B82Y 25/00 360/125.45 |
| 8,270,112 B2* | 9/2012 | Funayama | ................ | G11B 5/02 360/125.3 |
| 8,537,497 B2* | 9/2013 | Nagasaka | ................ | H01L 43/08 360/125.3 |
| 8,559,134 B2* | 10/2013 | Yamada | ................ | G11B 5/1278 360/125.3 |
| 8,643,972 B2* | 2/2014 | Shiroishi | ............. | G11B 5/3146 360/125.74 |
| 8,675,308 B2* | 3/2014 | Yamada | ................ | G11B 5/1278 360/125.3 |
| 8,773,818 B2* | 7/2014 | Taguchi | ................ | G11B 5/23 360/125.3 |
| 8,810,961 B2* | 8/2014 | Taguchi | ............... | G11B 5/1278 360/123.11 |
| 8,917,481 B2* | 12/2014 | Kusukawa | ............. | G11B 5/187 360/125.3 |
| 2009/0080105 A1 | 3/2009 | Takashita et al. | | |
| 2009/0225465 A1* | 9/2009 | Iwasaki | ................ | G11B 5/1278 360/75 |
| 2010/0073806 A1* | 3/2010 | Koui | ........................ | G11B 5/02 360/75 |
| 2010/0110592 A1 | 5/2010 | Koui et al. | | |
| 2011/0242705 A1* | 10/2011 | Takagishi | ............... | B82Y 10/00 360/246.1 |
| 2013/0050869 A1 | 2/2013 | Nagasaka et al. | | |

OTHER PUBLICATIONS

Ioan Tudosa et al. " Perpendicular spin-torque switching with a synthetic antiferromagnetic reference layer", Applied Physics Letters 96, 2010, 3 pages.

S. Mangin et al. "Current-induced magnetization reversal in nanopillars with perpendicular anisotropy", Nature Materials, vol. 5, 2006, 6 pages.

* cited by examiner

*Primary Examiner* — Brian Miller
(74) *Attorney, Agent, or Firm* — Oblon, McClelland, Maier & Neustadt, L.L.P

(57) ABSTRACT

The magnetic recording head according to an embodiment includes an air bearing surface configured to face a magnetic recording medium, a main magnetic pole including a main magnetic pole distal end, a first spin injection layer disposed on a leading side of the main magnetic pole, a field generation layer disposed on a trailing side of the main magnetic pole, and an intermediate layer configured to connect electrically the field generation layer to the first spin injection layer. The main magnetic pole is configured to apply a recording magnetic field to the magnetic recording medium.

12 Claims, 19 Drawing Sheets

MAGNETIC RECORDING HEAD AND MAGNETIC RECORDING APPARATUS

CROSS-REFERENCE TO RELATED APPLICATION

This application is based upon and claims the benefit of priority from Japanese Patent Application No. 2014-092129, filed on Apr. 25, 2014, the entire contents of which are incorporated herein by reference.

FIELD

Embodiments described herein relate generally to a magnetic recording head and a magnetic recording apparatus.

BACKGROUND

To increase the recording density of a magnetic recording apparatus, a microwave assisted magnetic recording method is proposed. The microwave assisted magnetic recording method reduces the magnetic switching field of a magnetic recording layer on a magnetic recording medium by applying a high-frequency magnetic field to the magnetic recording medium. This can increase the recording density using a magnetic recording layer having high coercivity (Hc) and high magnetic anisotropy energy (Ku).

A technique using a spin torque oscillator as the source for generating such a high-frequency magnetic field is disclosed. The high-frequency magnetic field is generated from a field generation layer of the spin torque oscillator. To generate a high-intensity high-frequency magnetic field in order to improve the long-term reliability, it is preferable that the spin torque is efficiently applied to the field generation layer.

DETAILED DESCRIPTION

The magnetic recording head of an embodiment includes an air bearing surface configured to face a magnetic recording medium, a main magnetic pole including a main magnetic pole distal end, the main magnetic pole being configured to apply a recording magnetic field to the magnetic recording medium, a first spin injection layer disposed on a leading side of the main magnetic pole, a field generation layer disposed on a trailing side of the main magnetic pole, and an intermediate layer configured to connect electrically the field generation layer to the first spin injection layer.

The embodiments of the present disclosure will be described hereinafter with the appended drawings.

First Embodiment

The magnetic recording head of the present embodiment includes an air bearing surface configured to face a magnetic recording medium, a main magnetic pole including a main magnetic pole distal end, the main magnetic pole being configured to apply a recording magnetic field to the magnetic recording medium, a first spin injection layer disposed on a leading side of the main magnetic pole, a field generation layer disposed on a trailing side of the main magnetic pole, and an intermediate layer configured to connect electrically the field generation layer to the first spin injection layer.

Figure 1:
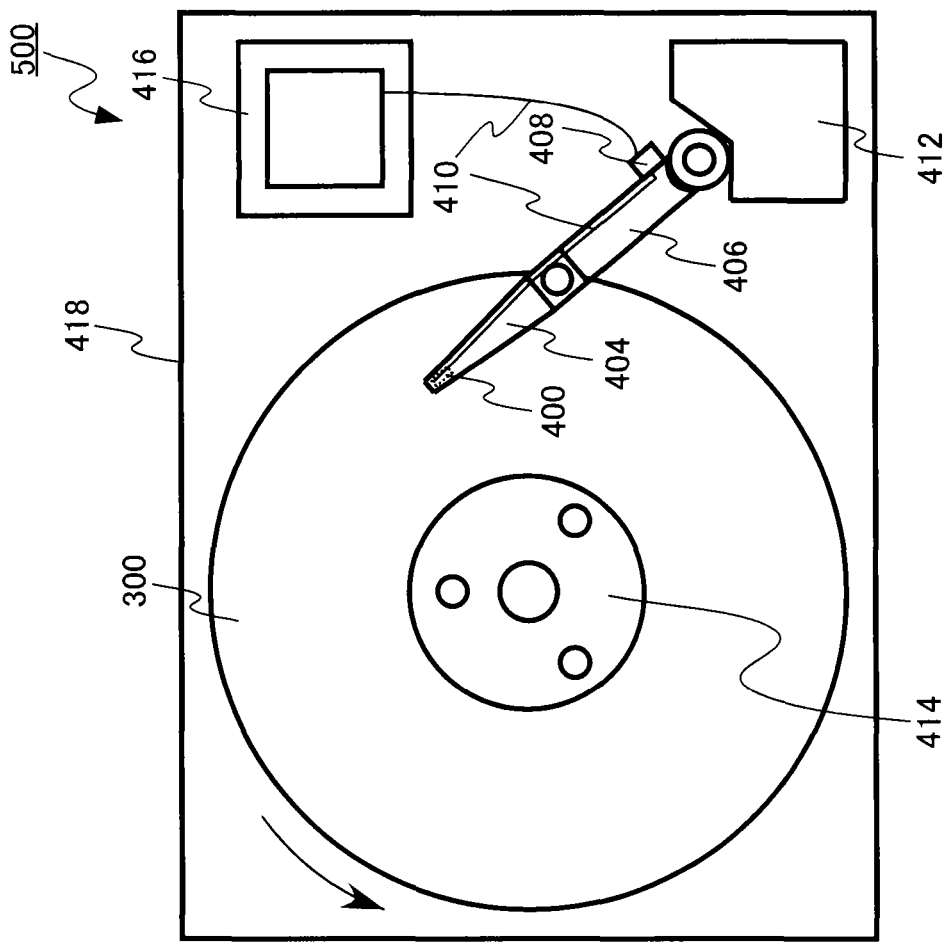
FIG. 1 is a schematic diagram of a magnetic recording apparatus according to a first embodiment.

FIG. 1 is a schematic diagram of a magnetic recording apparatus according to the first embodiment.

A magnetic recording apparatus 500 includes a magnetic recording medium 300 disposed in a housing 418. The magnetic recording medium 300 has a disk shape in which the information is recorded or reproduced using a magnetic recording head 200 and a magnetic reproducing head 250 that are installed on a slider 400. The spindle motor (rotating unit) 414 rotates the magnetic recording medium 300 in the circumferential direction of the magnetic recording medium 300 illustrated in FIG. 1. A spin torque oscillator 100 to be described below is a part of the magnetic recording head 200.

A Voice Coil Motor (VCM) 412 moves the slider 400 to a predetermined position on the magnetic recording medium 300 through an arm 406 and a suspension 404. The suspension 404 functions to press the slider 400 onto the magnetic recording medium 300 using the force of a spring.

The power source 408 supplies electricity that drives the spin torque oscillator 100, the magnetic recording head 200 and the magnetic reproducing head 250. The way of driving varies depending on the component. It can be a constant current drive that controls the current such that a constant current flows through a load, or can be a constant voltage drive that controls the voltage such that a constant voltage is applied across a load, and is not limited specifically.

The control unit 416 controls the power source 408, the voice coil motor 412 and the spindle motor 414.

Figure 2:
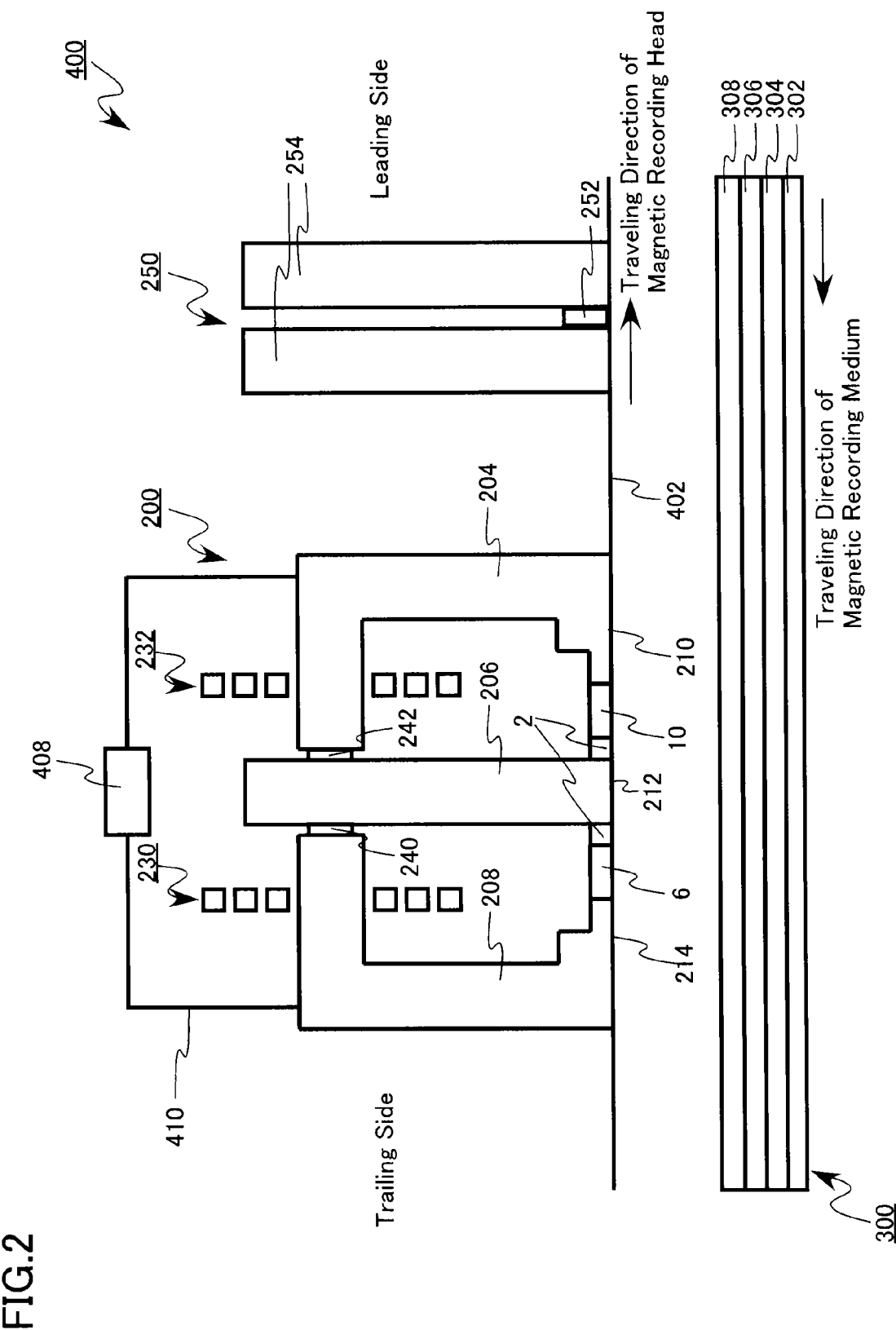
FIG. 2 is a schematic cross-sectional diagram of a slider and a magnetic recording medium according to the first embodiment.

FIG. 2 is a schematic cross-sectional diagram of the slider 400 and the magnetic recording medium 300 according to the present embodiment.

The magnetic recording medium 300 proceeds to the left side of the paper of FIG. 2 with the spindle motor 414. Thus, the slider 400 relatively proceeds to the right side of the paper of FIG. 2. The side to which the slider 400 proceeds is referred to as a leading side. The side to which the magnetic recording medium 300 proceeds is referred to as a trailing side.

The slider 400 includes the disk facing surface (Air Bearing Surface: ABS) 402 configured to face the magnetic recording medium 300. The balance between the force of the suspension 404 to press the slider 400 onto the magnetic recording medium 300 and the pressure generated by the viscosity of the air between the disk facing surface 402 and the magnetic recording medium 300 causes the slider 400 to float on the magnetic recording medium 300.

A magnetic recording head 200 is disposed on the trailing side of the slider 400.

A main magnetic pole 206 has a structure in which a main magnetic pole distal end 212 that is the distal end of the main magnetic pole 206 is disposed on the disk facing surface 402. The main magnetic pole 206 applies a recording magnetic field to the magnetic recording medium 300. In the disk facing surface 402, the main magnetic pole distal end 212 has a size, for example, of about 20 to 100 nm in a direction in which the magnetic recording head 200 moves in a plane parallel to the disk facing surface 402, and of about 20 to 100 nm in a direction perpendicular to the direction in which the magnetic recording head 200 moves in a plane parallel to the disk facing surface 402.

A trailing shield 208 is disposed on the trailing side of the main magnetic pole 206 and separately from the main magnetic pole 206. A trailing shield distal end 214 that is the distal end of the trailing shield 208 is disposed on the disk facing surface 402. The distance between the trailing shield 208 and the main magnetic pole 206 near the disk facing surface 402 is referred to as a write gap. The trailing shield 208 returns the recording magnetic field applied from the main magnetic pole 206.

A leading shield 204 is disposed on the leading side of the main magnetic pole 206 and separately from the main magnetic pole 206. A leading shield distal end 210 that is the distal end of the leading shield 204 is disposed on the disk facing surface 402. The leading shield 204 returns the recording magnetic field applied from the main magnetic pole 206.

A high magnetization soft magnetic alloy is used as the material of the main magnetic pole 206, the trailing shield 208, and the leading shield 204. For example, the main magnetic pole 206, the trailing shield 208, and the leading shield 204 is preferably made of iron (Fe), cobalt (Co), nickel (Ni), or the alloy of Fe, Co and Ni.

The first coil 230 is disposed around the trailing shield 208 and configured to generate a magnetic field. The generated magnetic field passes through the main magnetic pole 206 and is applied as the recording magnetic field from the main magnetic pole distal end 212 to the magnetic recording medium 300.

The second coil 232 is disposed around the leading shield 204 and configured to generate a magnetic field by supplying a current. The generated magnetic field passes through the main magnetic pole 206 and is applied as the recording magnetic field from the main magnetic pole distal end 212 to the magnetic recording medium 300.

The power source 408 is connected to the leading shield 204 and the trailing shield 208 through a wire 410, and configured to apply a driving current to the spin torque oscillator 100 through the leading shield 204 and the trailing shield 208. The direction of the driving current is a direction from a field generation layer 6 to a first spin injection layer 10 that are to be described below. It is noted that the direction of the electron that drives the spin torque oscillator 100 is opposite to the direction of the driving current and is from the first spin injection layer 10 to the field generation layer 6.

A first backgap portion 240 is disposed at a space between the trailing shield 208 and the main magnetic pole 206. A second backgap portion 242 is disposed at a space between the leading shield 204 and the main magnetic pole 206. Each of the spaces separates from the disk facing surface 402. Each of the first backgap portion 240 and the second backgap portion 242 is formed, for example, of an insulator. If the trailing shield 208 and the main magnetic pole 206, and the leading shield 204 and the main magnetic pole 206 are connected directly, a part of the driving current applied from the power source 408 flows through the portions of the leading shield 204, the main magnetic pole 206, and the trailing shield 208 that separate from the disk facing surface 402. Thus, the driving current is not applied to the spin torque oscillator 100 well. Thus, the first backgap portion 240 and the second backgap portion 242 are disposed in order to cause the driving current applied from the power source 408 to flow into the spin torque oscillator 100 well.

The magnetic reproducing head 250 is disposed on the leading side of the slider 400. The magnetic reproducing head 250 includes a magnetoresistive effect element 252 of which portion is on the disk facing surface 402, and two shields 254 disposed on the leading side and trailing side of the magnetoresistive effect element 252, respectively.

The magnetic recording medium 300 includes a substrate 302, a soft magnetic underlayer 304 disposed on the substrate 302, a magnetic recording layer 306 disposed on the soft magnetic underlayer 304, and a protection layer 308 disposed on the magnetic recording layer 306. The magnetic recording layer 306 stores the information recorded with the recording head 200 and includes a ferromagnet. The recording magnetic field applied from the main magnetic pole 206 passes through the soft magnetic underlayer 304 and is returned to the trailing shield 208 and the leading shield 204.

Figure 3:
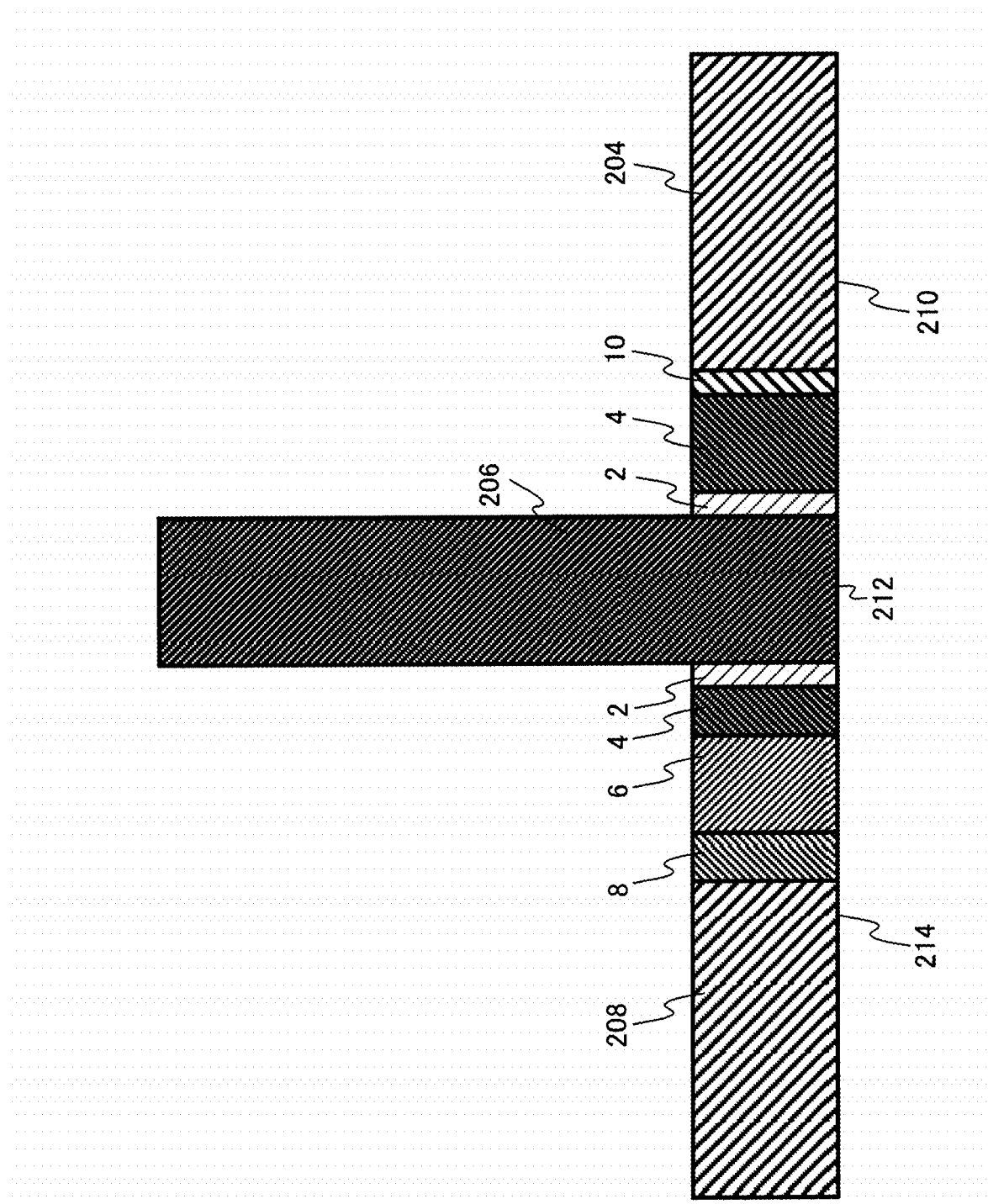
FIG. 3 is a schematic cross-sectional diagram of a main part of the magnetic recording head according to the first embodiment.
Figure 4:
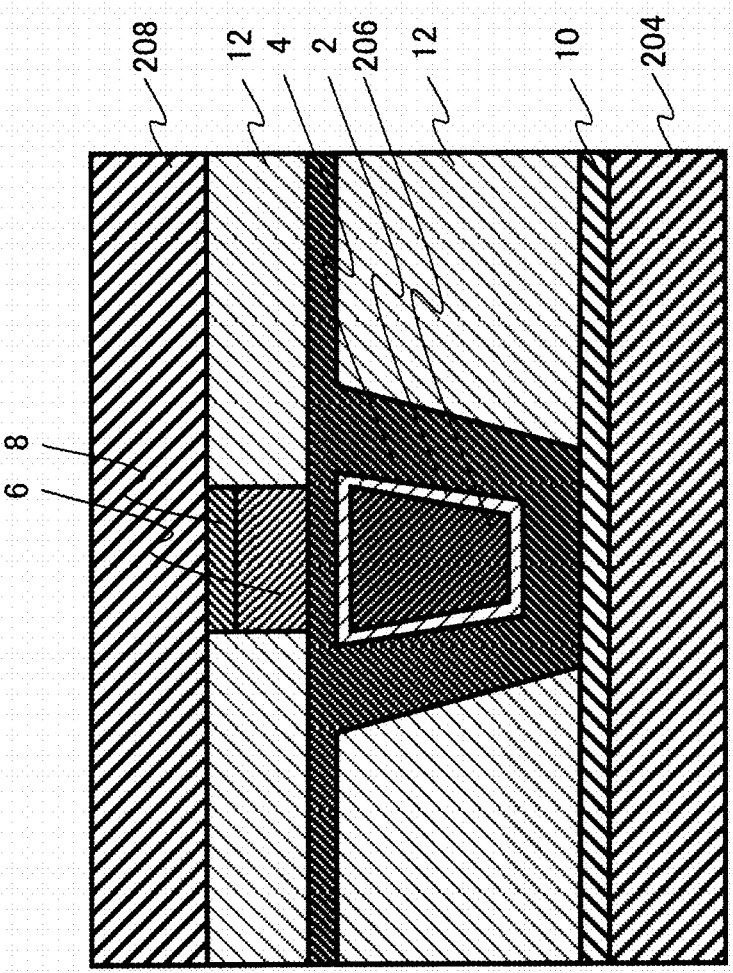
FIG. 4 is a schematic diagram of the magnetic recording head according to the first embodiment viewed from a disk facing surface (an air bearing surface: ABS)

FIG. 3 is a schematic cross-sectional diagram of a main part of the magnetic recording head 200 according to the present embodiment. FIG. 4 is a schematic diagram of the magnetic recording head 200 according to the present embodiment viewed from the disk facing surface 402.

The spin torque oscillator includes at least a spin injection layer, an intermediate layer, and a field generation layer.

The first spin injection layer 10 is provided on the leading side of the main magnetic pole 206. The first spin injection layer 10 polarizes the spin of the driving current and injects the spin torque into the field generation layer 6 to be described below.

A magnetic metal with high spin polarizability is preferably used as the first spin injection layer 10. Specifically, a Fe—Co alloy-based magnetic alloy or a magnetic Heusler alloy can be used. The first spin injection layer 10 preferably has a thickness larger than the spin diffusion length of each material used for the first spin injection layer 10, and 2 nm or more is enough. On the other hand, if the thickness of the first spin injection layer 10 is too thick, the recording resolution is deteriorated. Thus, the thickness is preferably 20 nm or less.

The field generation layer 6 is provided on the trailing side of the main magnetic pole 206. The injection of the spin torque into the field generation layer 6 causes the magnetization in the field generation layer 6 to rotate. Thus, the high-frequency magnetic field is applied to the magnetic recording medium 300 and the inversion of the magnetization in the magnetic recording layer 306 by the recording magnetic field is easily performed.

A soft magnetic material having a high saturation magnetization (Bs) is used for the field generation layer 6. Specifically, the field generation layer 6 includes at least one magnetic metal selected from a group consisting of Fe, Co, and Ni. To increase the strength of the high-frequency magnetic field, a material having a higher-saturation magnetic field, for example, a Fe—Co alloy is preferably used.

The thicker the field generation layer 6 is, the stronger the high-frequency magnetic field is. However, when the thickness increases, the magnetization of the field generation layer 6 does not rotate sufficiently. Thus, the field generation layer 6 preferably has a thickness of about 10 nm to 30 nm.

The intermediate layer 4 is disposed around the main magnetic pole distal end 212 to electrically connect the field generation layer 6 to the first spin injection layer 10. The intermediate layer 4 transports the driving current which is spin-polarized by the first spin injection layer 10 to the field generation layer 6.

Gold (Au), silver (Ag), copper (Cu), aluminum (Al), a nickel-aluminum (NiAl) alloy, an aluminum-copper (AlCu) alloy, or a non-magnetic alloy made of the materials selected from those listed above can be used as the intermediate layer 4.

The material used for the intermediate layer 4 is preferably a material with a long spin diffusion length such that the spin information on the current flowing in the intermediate layer 4 is maintained. Thus, a material used for the intermediate layer 4 is preferably a simple substance rather than an alloy.

The thickness of the intermediate layer 4 in the disk facing surface 402 is determined considering all the designs of the main magnetic pole 206, the leading shield 204, and the trailing shield 208. However, to flow a large enough current, the intermediate layer 4 preferably has a thickness of 2 nm or more between the field generation layer 6 and the main magnetic pole distal end 212, and has a thickness of 2 nm or more between the first spin injection layer 10 and the main magnetic pole distal end 212. The thickness of the intermediate layer perpendicular to the moving direction of the magnetic recording head 200 and in the plane parallel to the disk facing surface is preferably 2 nm or more, and more preferably, 5 nm or more in order to reduce the resistance, because the length of the main magnetic pole 206 in the moving direction of the magnetic recording head 200 in the disk facing surface 206 is generally longer than the length of the main magnetic pole 206 perpendicular to the moving direction of the magnetic recording head 200 in the disk facing surface 206. On the other hand, if the intermediate layer 4 is too thick, the amount of spin polarization is reduced. Thus, the intermediate layer 4 preferably has a thickness of 100 nm or less in any part.

To reduce the resistance of the intermediate layer 4 and simplify the production, the thickness of the intermediate layer 4 in a plane perpendicular to the disk facing surface 402 is preferably equal to or more than ⅔ of the thickness of the leading shield distal end 210 or the trailing shield distal end 214 and equal to or less than the thickness of the leading shield distal end 210 or the trailing shield distal end 214.

The spin screening layer 2 is disposed between the main magnetic pole distal end 212 and the intermediate layer 4. The spin screening layer 2 is provided to suppress the spin torque injected from the main magnetic pole 206 into the field generation layer 6. Thus, it is preferable that the main magnetic pole distal end 212 is covered completely with the spin screening layer 2 and does not directly contact with the intermediate layer 4.

An insulator can be used as the material of the spin screening layer 2. Specifically, the oxide or nitride of a metal such as silicon (Si) or aluminum (Al) can be used.

Alternatively, a non-magnetic element with a large spin orbit coupling and a large atomic number can be used as the material of the spin screening layer 2 because this can erase the spin information. For example, at least one metal selected from a group consisting of zirconium (Zr), niobium (Nb), molybdenum (Mo), palladium (Pd), hafnium (Hf), platinum (Pt), ruthenium (Ru), tungsten (W), tantalum (Ta), and rhodium (Rh) is preferably used. Especially, using Pt is preferable because Pt has a large effect to disturb the spin polarization of the electrons passing through Pt.

To shield the current flowing from the main magnetic pole 206 and prevent the interference of the flow of the current in the intermediate layer 4, the spin screening layer 2 preferably has a thickness equal to or more than 0.5 nm and equal to or less than 10 nm in the plane parallel to the disk facing surface 402.

An underlayer (not illustrated in the drawings) is disposed between the leading shield 204 and the first spin injection layer 10. The underlayer is used to improve the quality of a magnetic film used for the spin torque oscillator 100. For example, Ta, Ru, Cu, or a laminated structure of Ta, Ru and Cu is used as the underlayer.

A cap layer 8 is disposed on the trailing side of the field generation layer 6. The cap layer 8 electrically connects the field generation layer 6 to the trailing shield 208. The material of the cap layer 8 preferably includes the same material as the intermediate layer 4 in order to inject the spin torque due to the reflection from the trailing shield 208 into the field generation layer 6.

An insulator layer 12 is disposed around the intermediate layer 4, the field generation layer 6, the cap layer 8, the first spin injection layer 10, and the underlayer. The insulator layer 12 concentrates the flow of the electrons polarized by the spin injection layer 10 on the field generation layer 6. For example, the oxide of aluminum is used as the insulator layer 12. The insulator layer 12 preferably contacts with the field generation layer 6 directly. However, the insulator layer 12 can contact with the field generation layer 6 through the intermediate layer 4. When the insulator layer 12 contacts the field generation layer 6 through the intermediate layer 4, some electrons pass through the intermediate layer 4 to the trailing shield 208 without passing through the field generation layer 6, however, this does not adversely affect the long-term reliability.

Next, a method for producing the magnetic recording head 200 of the present embodiment will be described.

Figure 5:
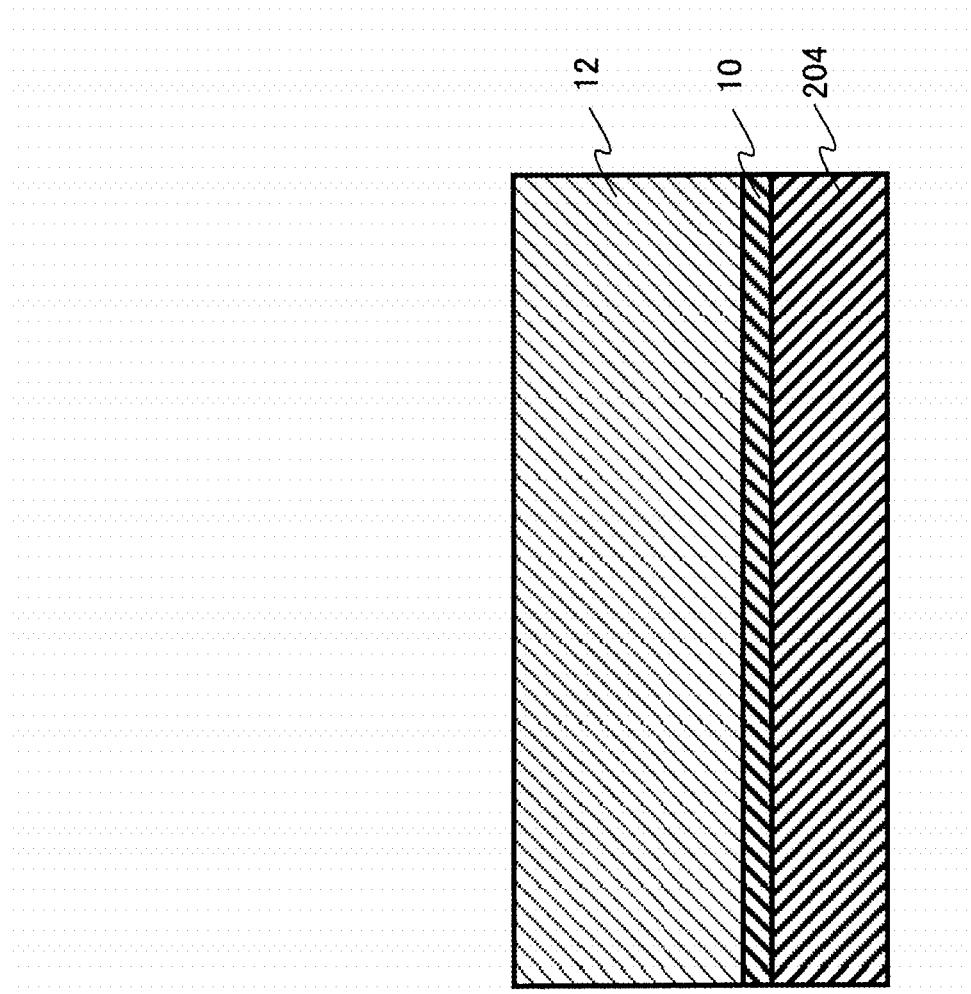
FIG. 5 is a schematic diagram of a manufacturing process of the magnetic recording head according to the first embodiment.

First, the leading shield 204 is formed as illustrated in FIG. 5. Then, the first spin injection layer 10 and the insulator layer 12 are formed thereon, for example, with a sputtering method.

Figure 6:
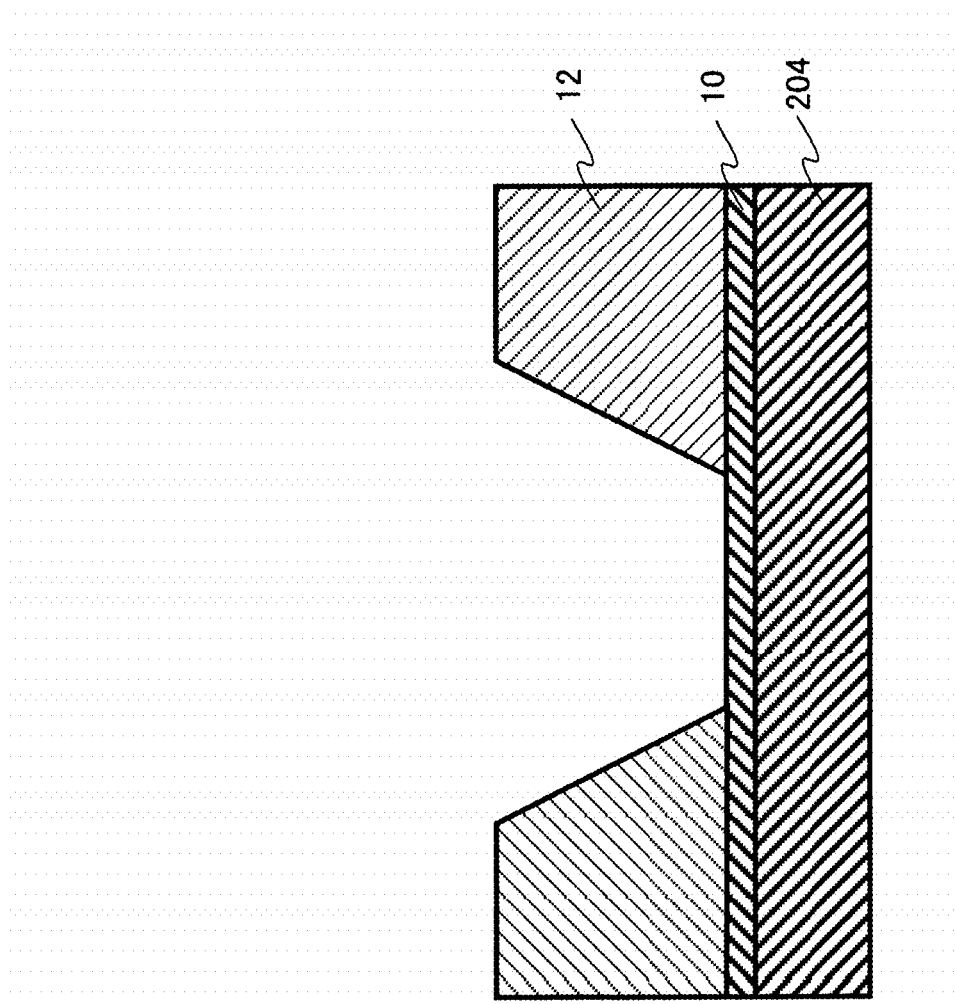
FIG. 6 is a schematic diagram of a manufacturing process of the magnetic recording head according to the first embodiment.

Next, as illustrated in FIG. 6, the insulator layer 12 is fabricated, for example, with lithography to create an opening portion and expose the surface of the first spin injection layer 10 under the opening portion.

Figure 7:
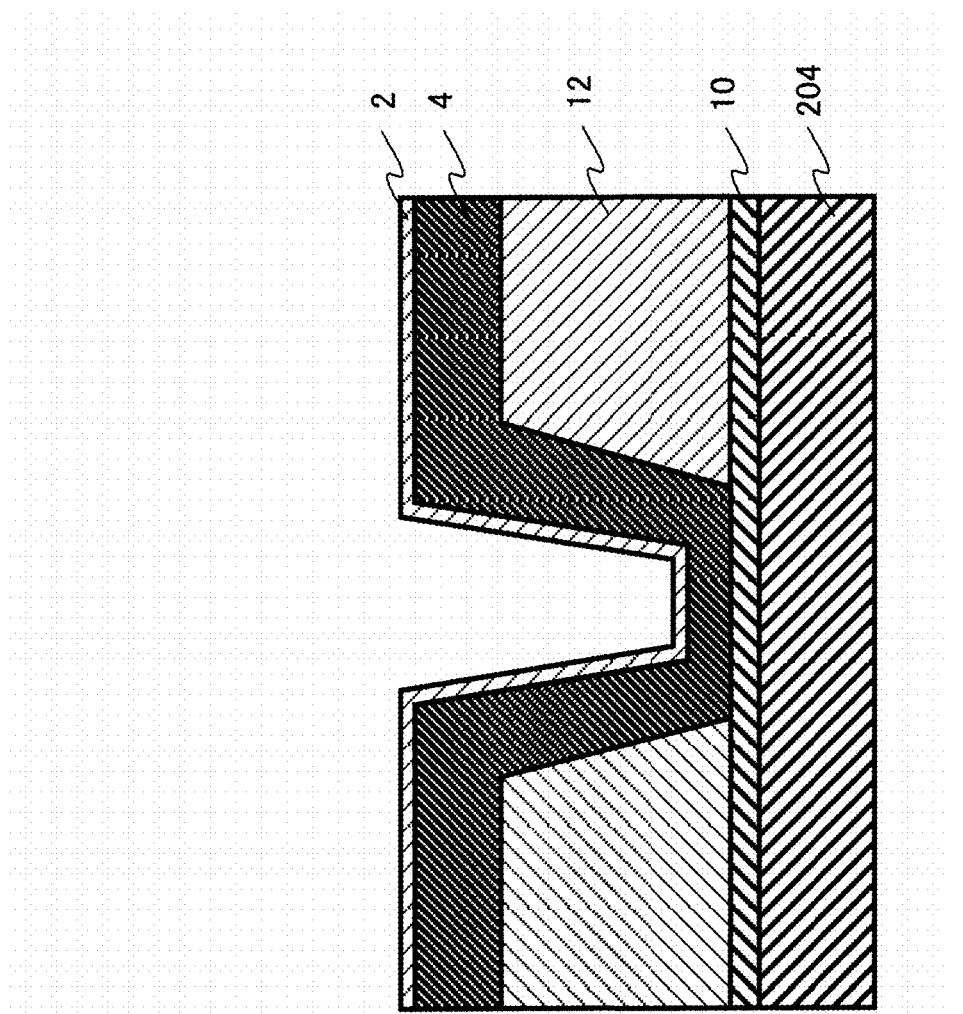
FIG. 7 is a schematic diagram of a manufacturing process of the magnetic recording head according to the first embodiment.

Next, as illustrated in FIG. 7, the intermediate layer 4 is formed, for example, with a sputtering method. Next, a spin screening layer 2 is formed on the intermediate layer 4, for example, with a sputtering method.

Figure 8:
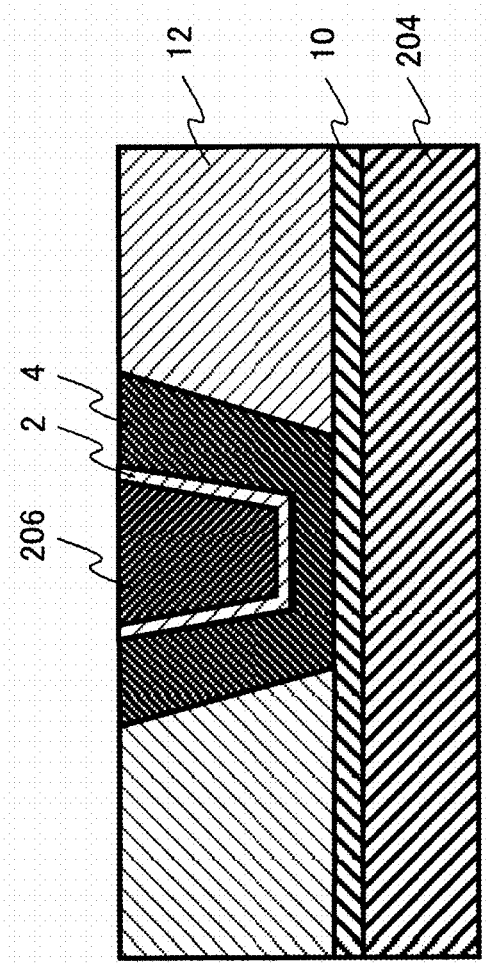
FIG. 8 is a schematic diagram of a manufacturing process of the magnetic recording head according to the first embodiment.

Next, as illustrated in FIG. 8, the main magnetic pole 206 is formed, for example, with a plating method. Next, the main magnetic pole 206, the intermediate layer 4, and the spin screening layer 2 are ground, for example, with chemical mechanical polishing (CMP). In FIG. 8, they are ground until the surface of the insulator layer 12 is exposed. However, the surface of the insulator layer 12 does not have to be exposed.

Figure 9:
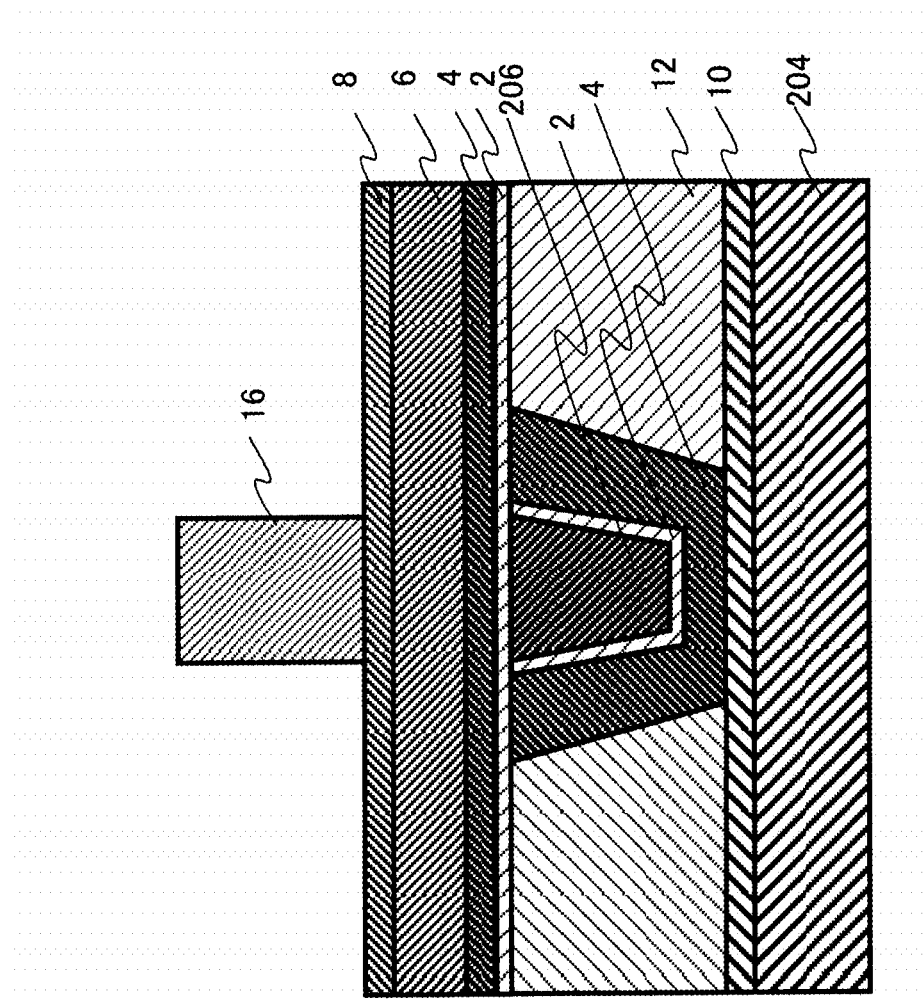
FIG. 9 is a schematic diagram of a manufacturing process of the magnetic recording head according to the first embodiment.

Next, as illustrated in FIG. 9, the spin screening layer 2, the intermediate layer 4, the field generation layer 6, and the cap layer 8 are sequentially formed, for example, with a sputtering method. Next, a photomask 16 is formed on the cap layer 8.

Figure 10:
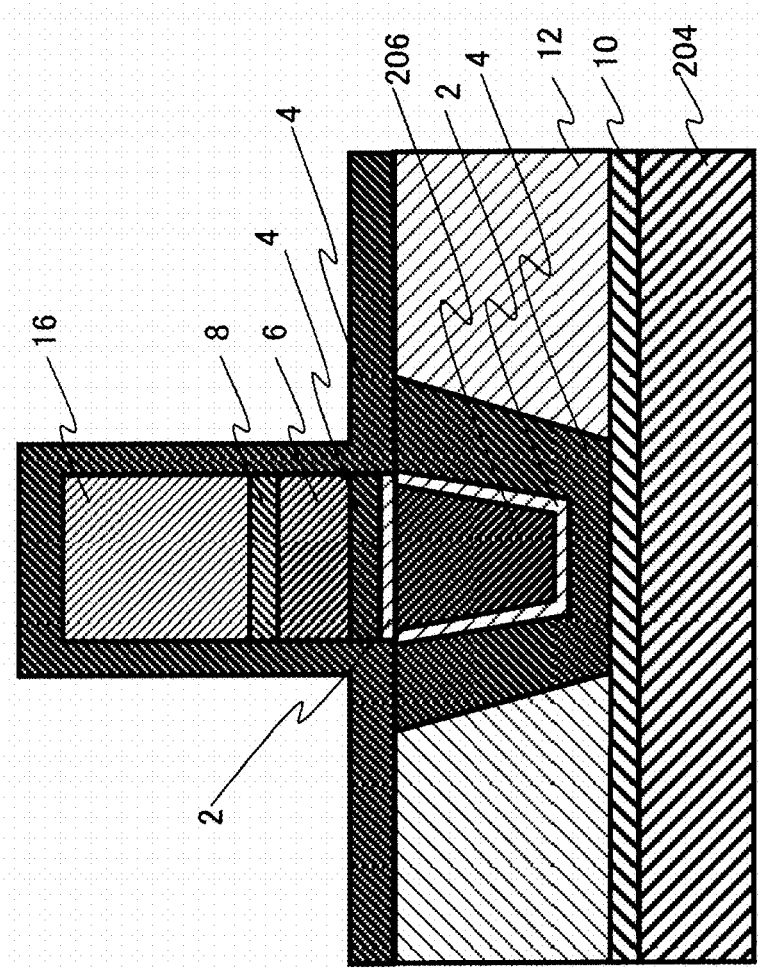
FIG. 10 is a schematic diagram of a manufacturing process of the magnetic recording head according to the first embodiment.

Next, as illustrated in FIG. 10, the spin screening layer 2, the intermediate layer 4, the field generation layer 6, and the cap layer 8 are removed from the right and left sides of the photomask 16, for example, by ion milling. Next, an intermediate layer 4 is formed on the photomask 16.

Figure 11:
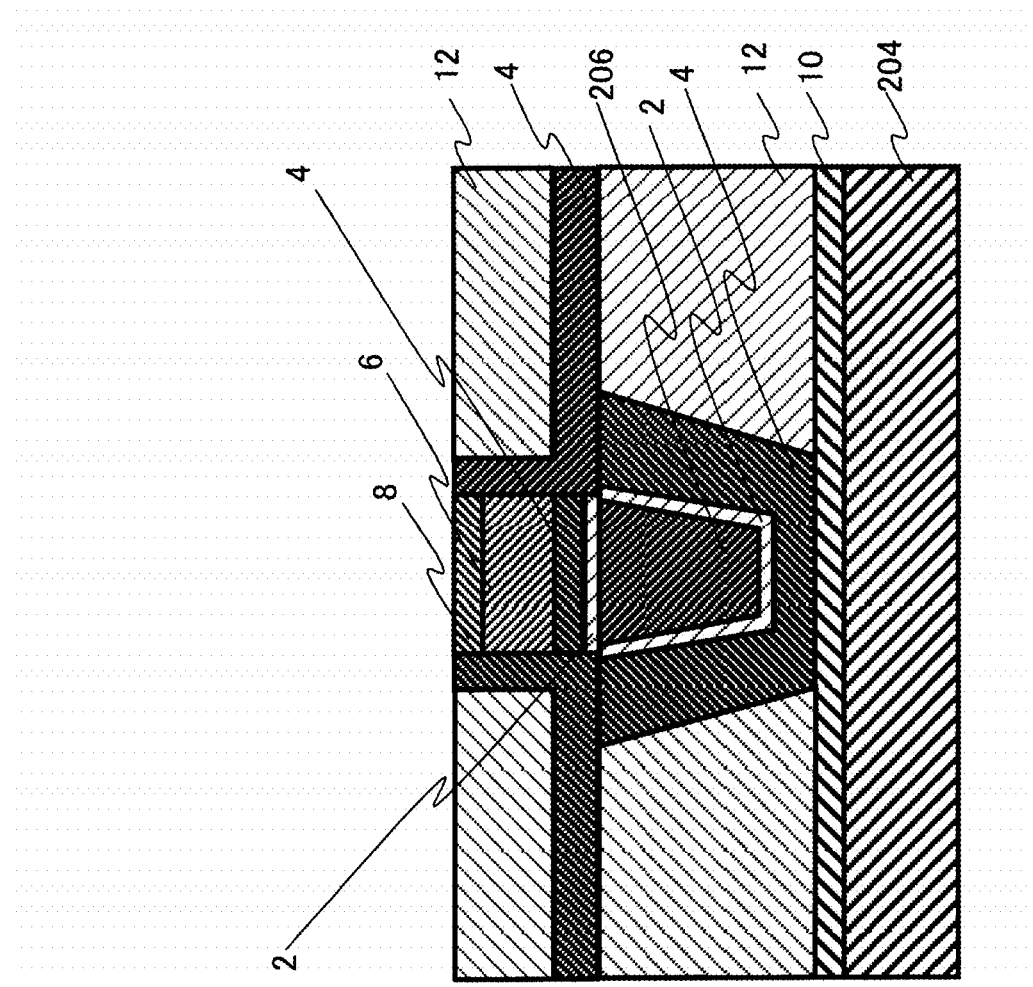
FIG. 11 is a schematic diagram of a manufacturing process of the magnetic recording head according to the first embodiment.

Next, as illustrated in FIG. 11, the photomask 16 is removed, for example, by lift-off. Next, the insulator layer 12 is formed on the surface. Next, a part of the insulator layer 12 is removed, for example, with ion milling to expose the surface of the cap layer 8.

Figure 12:
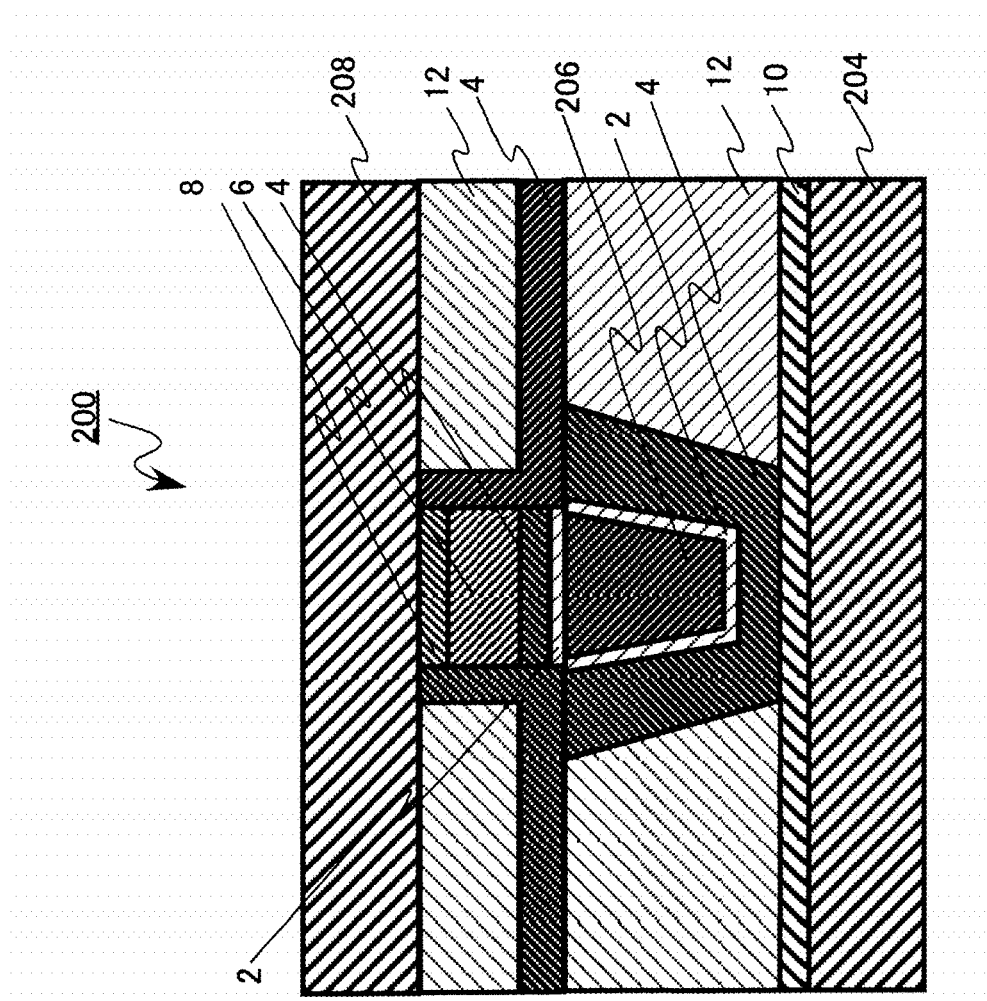
FIG. 12 is a schematic diagram of a manufacturing process of the magnetic recording head according to the first embodiment.

Next, as illustrated in FIG. 12, the trailing shield 208 is formed on the surface to finish fabricating the magnetic recording head 200 of the present embodiment.

A magnetic recording head 200 of the present embodiment was produced using $Fe_{40}Co_{40}AL_{20}$ (atomic %) with a thickness of 3 nm as the first spin injection layer 10, $Fe_{50}Co_{50}$ (atomic %) with a thickness of 15 nm as the field generation layer 6, Cu as the intermediate layer 4, and Ru with a thickness of 5 nm as the cap layer 8 in a manner described above. A magnetic recording head 200 in which both of a first spin injection layer 10 and a field generation layer 6 were disposed on the trailing side of a main magnetic pole 206 was produced as a comparison example using $Fe_{40}Co_{40}AL_{20}$ (atomic %) with a thickness of 3 nm as the first spin injection layer 10, $Fe_{50}Co_{50}$ (atomic %) with a thickness of 15 nm as the field generation layer 6, Cu as the intermediate layer 4, and Cu with a thickness of 5 nm as the cap layer 8. When the driving current in the present embodiment was compared with the driving current in the comparison example, the effect of decreasing the driving current by 30% was obtained in the magnetic recording head 200 of the present embodiment.

Next, the effect of the present embodiment will be described.

Figure 13:
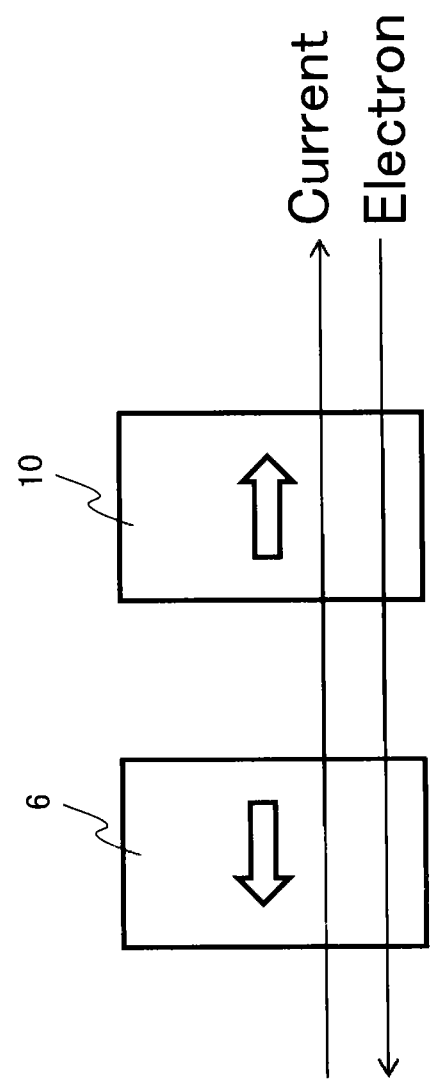
FIG. 13 is a schematic diagram of an effect of the magnetic recording head according to the first embodiment.

FIG. 13 is a schematic diagram for describing the function effect of the present embodiment. In the present embodiment, the first spin injection layer 10 is disposed on the leading side of the main magnetic pole 206 and the field generation layer 6 is disposed on the trailing side. Thus, the magnetization of the first spin injection layer 10 and the magnetization of the field generation layer 6 is aligned antiparallel each other when the magnetic field is generated downward from the main magnetic pole 206 to the magnetic recording medium 300 and when the magnetic field is generated upward from the magnetic recording medium 300 to the main magnetic pole 206.

The direction of the driving current in the present embodiment is from the field generation layer 6 to the first spin injection layer 10. In that case, the direction of the flow of the electrons accompanied by the driving current is opposite to the direction of the driving current and is from the first spin injection layer 10 to the field generation layer 6. In that case, the electrons spin-polarized by the magnetization of the first spin injection layer 10 in the same direction as the magnetization of the first spin injection layer 10 pass through the field generation layer 6 to deliver the spin in the same direction as the magnetization of the first spin injection layer 10 in the field generation layer 6. This causes the oscillation of the magnetization of the field generation layer 6 and generates a high-frequency magnetic field.

On the other hand, when the direction of the magnetization of the first spin injection layer 10 and the direction of the magnetization of the field generation layer 6 are parallel to each other, the direction of the driving current is opposite to the direction in the present embodiment and is from the first spin injection layer 10 to the field generation layer 6. In that case, the direction of the flow of the electrons with the driving current is from the field generation layer 6 to the first spin injection layer 10. In that case, the electrons with the spin in the direction opposite to the magnetization of the first spin injection layer 10 are reflected on the interface on the field generation layer 6 side of the first spin injection layer 10 and are flowed into the field generation layer 6 to deliver the spin opposite to the direction of the magnetization of the field generation layer 6 in the field generation layer 6. This causes the oscillation of the magnetization of the field generation layer 6 and generates a high-frequency magnetic field.

When the direction of the magnetization of the first spin injection layer 10 and the direction of the magnetization of the field generation layer 6 are parallel to each other, only the reflection component of the electrons flowing in the direction opposite to the direction of the electrons with the driving current is used. On the other hand, the transmission component of the electrons flowing in the same direction as the direction of the electrons with the driving current is used in the present embodiment. This can increase the efficiency in the delivery of the spin, and thus can reduce the driving current and improve the long-term reliability of the spin torque oscillator 100.

The magnetization direction of the main magnetic pole distal end 212 on the trailing side is parallel to the direction of the magnetization of the field generation layer 6. Thus, when the spin screening layer 2 is not disposed, the electrons spin-polarized by the magnetization of the main magnetic pole distal end 212 on the trailing side flow into the field generation layer 6. This offsets the effect of flowing of the electrons spin-polarized in the first spin injection layer 10 into the field generation layer 6. Disposing the spin screening layer 2 can suppress the offset.

The magnetization of the main magnetic pole distal end 212 may be in an unexpected direction, for example, because of the magnetostriction of the main magnetic pole 206. When the electrons spin-polarized by the magnetization in the unexpected direction flow into the field generation layer 6, the generation of a high-frequency magnetic field is disturbed. Coating the main magnetic pole distal end 212 completely with the spin screening layer 2 can suppress the disturbance.

Including an insulator in the spin screening layer 2 can prevent the electrons spin-polarized by the main magnetic pole distal end 212 from flowing out.

Including at least a type of metal selected from a group consisting of Zr, Nb, Mo, Pd, Hf, Pt, Ru, W, Ta, and Rh in the spin screening layer 2 can erase the spin information on the electrons flowing out of the main magnetic pole distal end 212 because of the spin orbit coupling of Zr, Nb, Mo, Pd, Hf, Pt, Ru, W, Ta, and Rh.

As described above, the present embodiment can provide a magnetic recording head and magnetic recording apparatus in which the long-term reliability of the spin torque oscillator is improved by reducing the driving current.

Second Embodiment

Differently from the magnetic recording head of the first embodiment, in the magnetic recording head 200 of the present embodiment, the length of a first spin injection layer 10 perpendicular to the moving direction of the magnetic recording head 200 and in a plane parallel to a disk facing surface 402 is the same as the length of the part of the intermediate layer 4 which is the nearest to a leading shield 204 and perpendicular to the moving direction of the magnetic recording head 200 in a plane parallel to the disk facing surface 402. Hereinafter, the descriptions of the points overlapping with the first embodiment will be omitted.

Figure 14:
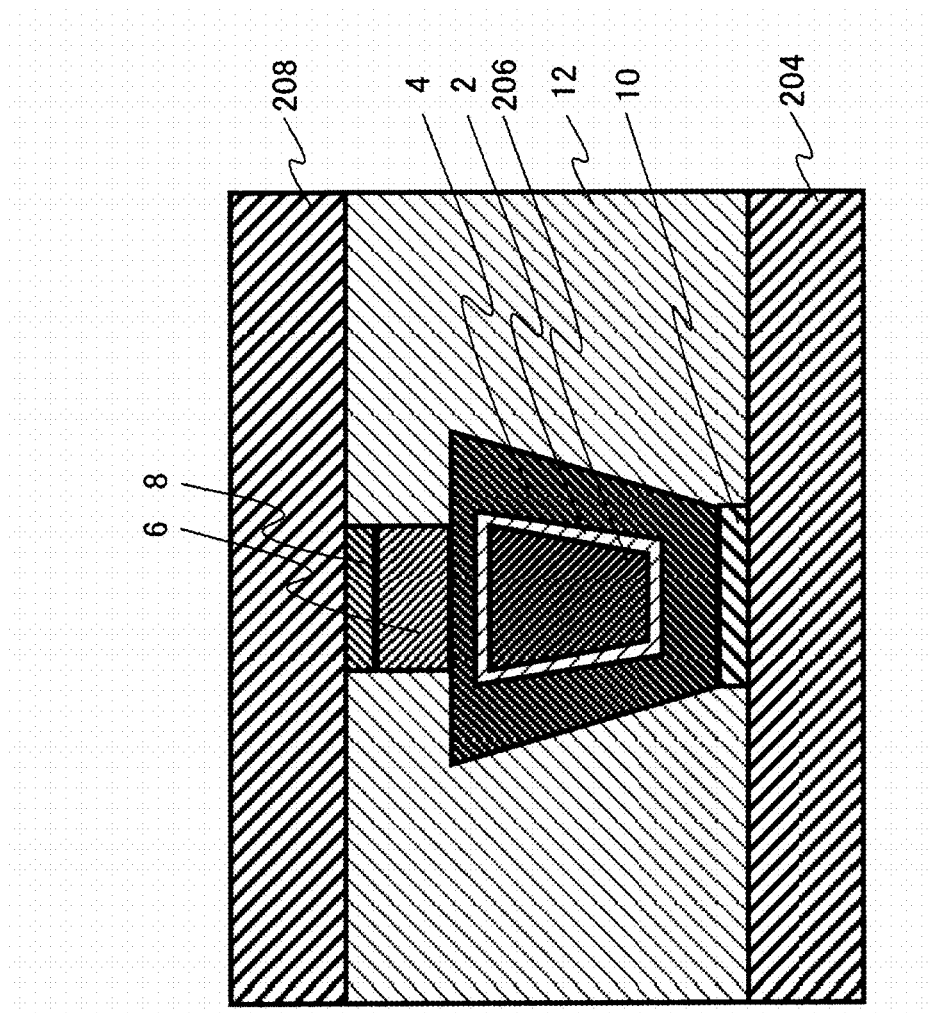
FIG. 14 is a schematic diagram of a magnetic recording head according to a second embodiment viewed from a disk facing surface.

FIG. 14 is a schematic diagram of the magnetic recording head according to the second embodiment viewed from the disk facing surface.

The first spin injection layer 10 with a short length reduces the diamagnetic field of the first spin injection layer 10 in the moving direction of the magnetic recording head 200. Thus, the magnetization of the first spin injection layer 10 is easily oriented in the moving direction of the magnetic recording head 200, which facilitates the spin polarization of the electrons passing through the spin injection layer 10, and can reduce the driving current. On the other hand, if the length of the spin injection layer 10 is too short, the electrons flowing into the intermediate layer 4 without passing through the first spin injection layer 10 are generated. Accordingly, the spin polarization rate decreases and the driving current increases. Thus, the length of the first spin injection layer 10 perpendicular to the moving direction of the magnetic recording head 200 and in the plane parallel to the disk facing surface 402 is preferably equal to or longer than the length of the part of the intermediate layer 4 at which the intermediate layer 4 contacts with the first spin injection layer 10 in the direction perpendicular to the moving direction of the magnetic recording head 200 and in the plane parallel to the disk facing surface 402.

On the other hand, if the length of the first spin injection layer 10 is longer than the length of the trailing shield 208 in the direction perpendicular to the moving direction of the magnetic recording head and in the plane parallel to the disk facing surface 402, an unexpected magnetic field is added to the part of the first spin injection layer 10 protruding from the trailing shield 208. This sometimes disturbs the direction of the magnetization of the first spin injection layer 10. Thus, the length of the first spin injection layer 10 is preferably equal to or less than a length of the trailing shield in the plane parallel to the air bearing surface and in the direction perpendicular to the moving direction of the magnetic recording head.

As described above, the present embodiment can provide a magnetic recording head in which the long-term reliability of the spin torque oscillator is improved by reducing the driving current and a magnetic recording apparatus using the magnetic recording head.

Third Embodiment

Differently from the magnetic recording head of the first embodiment, a magnetic recording head 200 of the present embodiment further includes a plurality of side shields 216 disposed on both sides of the main magnetic pole 206 in the moving direction perpendicular to the magnetic recording head. Hereinafter, the descriptions of the points overlapping with the first embodiment and the second embodiment will be omitted.

Figure 15:
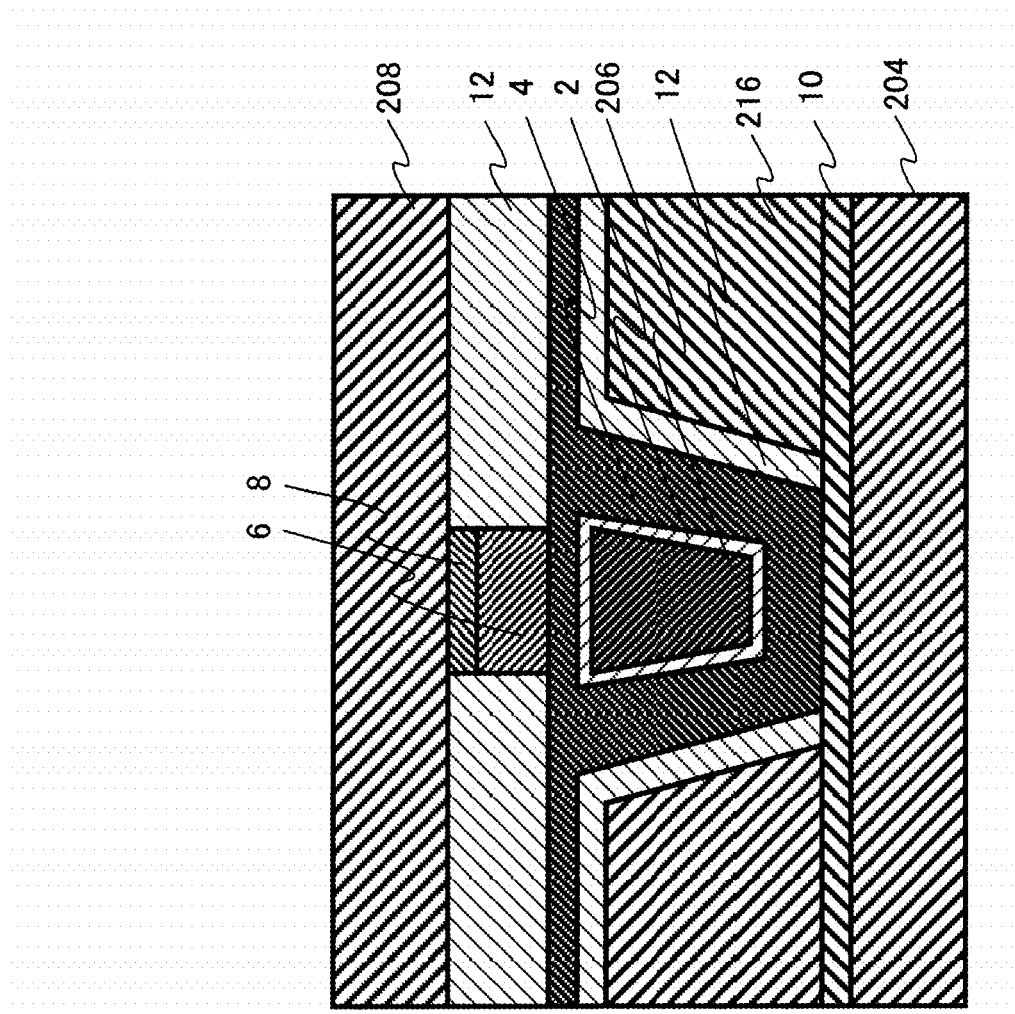
FIG. 15 is a schematic diagram of a magnetic recording head according to a third embodiment viewed from a disk facing surface.

FIG. 15 is a schematic diagram of a magnetic recording head 200 according to the third embodiment viewed from a disk facing surface 402.

The side shields 216 prevent the recording magnetic field from leaking to an adjacent track and are used for improving the recording resolution in a track width direction. Herein, the track width direction is a direction perpendicular to the moving direction of the magnetic recording head and in a plane parallel to the disk facing surface 402. A high magnetization soft magnetic alloy is used as the material of the side shields 216, similarly to the materials of the trailing shield 208 and the leading shield 204. For example, the side shields 216 are preferably made of iron (Fe), cobalt (Co), nickel (Ni), or an alloy thereof. Furthermore, the side shields 216 are preferably magnetically coupled with the trailing shield 208 or the leading shield 204 to return the recording magnetic field.

The present embodiment can provide a magnetic recording head in which the long-term reliability of the spin torque oscillator is improved by reducing the driving current and the recording resolution in the track width direction is improved, and a magnetic recording apparatus using the magnetic recording head.

Fourth Embodiment

Differently from the magnetic recording head of the third embodiment, the side shields 216 are coupled with a trailing shield 208 on a disk facing surface 402 in a magnetic recording head 200 of the present embodiment. Hereinafter, the descriptions of the points overlapping with the first embodiment, the second embodiment, and the third embodiment will be omitted.

Figure 16:
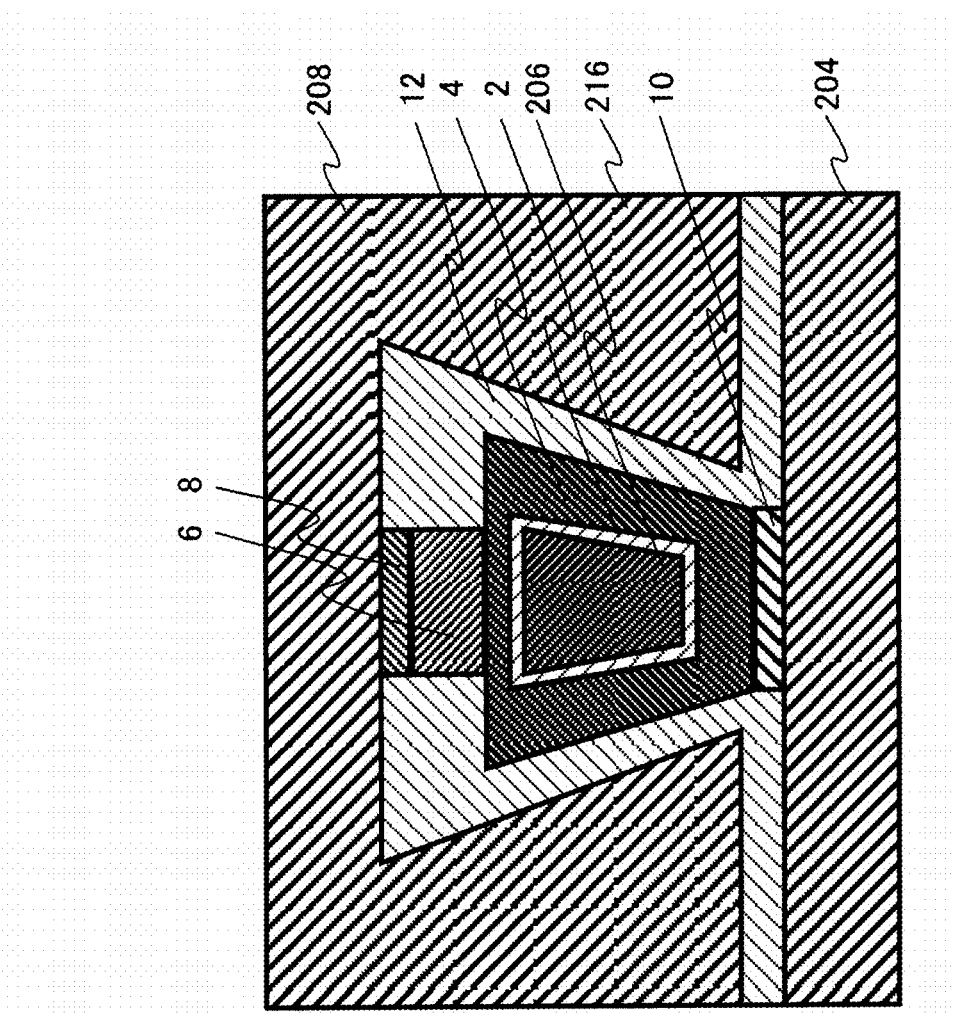
FIG. 16 is a schematic diagram of a magnetic recording head according to a fourth embodiment viewed from a disk facing surface.

FIG. 16 is a schematic diagram of the magnetic recording head 200 according to the fourth embodiment viewed from the disk facing surface 402. The side shields 216 can magnetically be coupled with the trailing shield 208 on the disk facing surface 402. It is noted that to efficiently inject the spin torque from a first spin injection layer 10 to the field generation layer 6, it is preferable in the present embodiment that the side shields 216 are electrically insulated from the first spin injection layer 10.

The present embodiment can provide a magnetic recording head in which the long-term reliability of the spin torque oscillator is improved by reducing the driving current and the recording resolution in the track width direction is improved, and a magnetic recording apparatus using the magnetic recording head.

Fifth Embodiment

Differently from the magnetic recording head of the fourth embodiment, the length of the first spin injection layer 10 in a direction perpendicular to the moving direction of the magnetic recording head 200 and in a plane parallel to a disk facing surface 402 is the same as the length of the part of an intermediate layer 4 which is the nearest to a leading shield 204 in a direction perpendicular to the moving direction of the magnetic recording head 200 and in a plane parallel to the disk facing surface 402 in the magnetic recording head 200 of the present embodiment. Hereinafter, the descriptions of the points overlapping with the first to fourth embodiments will be omitted.

Figure 17:
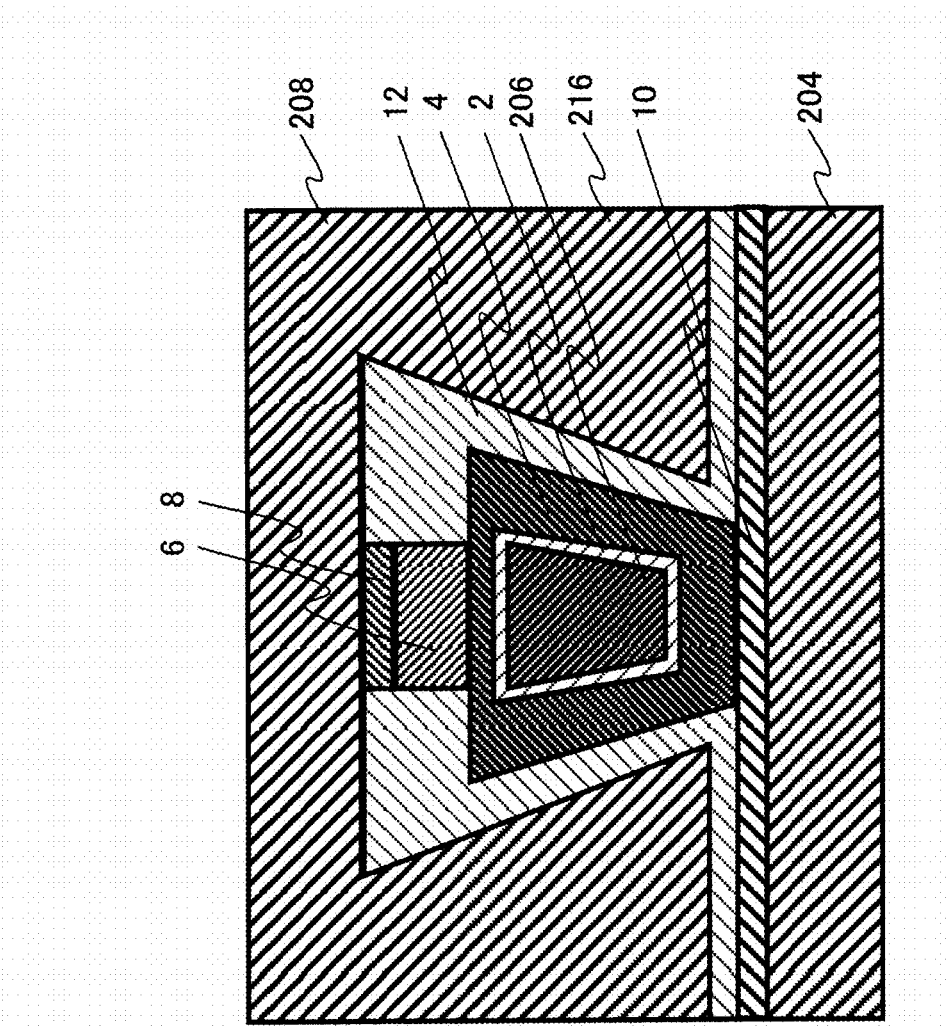
FIG. 17 is a schematic diagram of a magnetic recording head according to a fifth embodiment viewed from a disk facing surface.

FIG. 17 is a schematic diagram of the magnetic recording head 200 according to the fifth embodiment viewed from the disk facing surface 402.

The present embodiment can provide a magnetic recording head in which the long-term reliability of the spin torque oscillator is improved by reducing the driving current and the recording resolution in the track width direction is improved, and a magnetic recording apparatus using the magnetic recording head.

Sixth Embodiment

Differently from the magnetic recording head 200 of the first embodiment, a magnetic recording head 200 of the present embodiment further includes a pair of second spin injection layers 11 that are disposed on both sides of the main magnetic pole 206 in a direction perpendicular to the moving direction of the magnetic recording head, and that directly contact with a first spin injection layer 10. Hereinafter, the descriptions of the points overlapping with the descriptions of the magnetic recording head 200 according to the first to fifth embodiments will be omitted.

Figure 18:
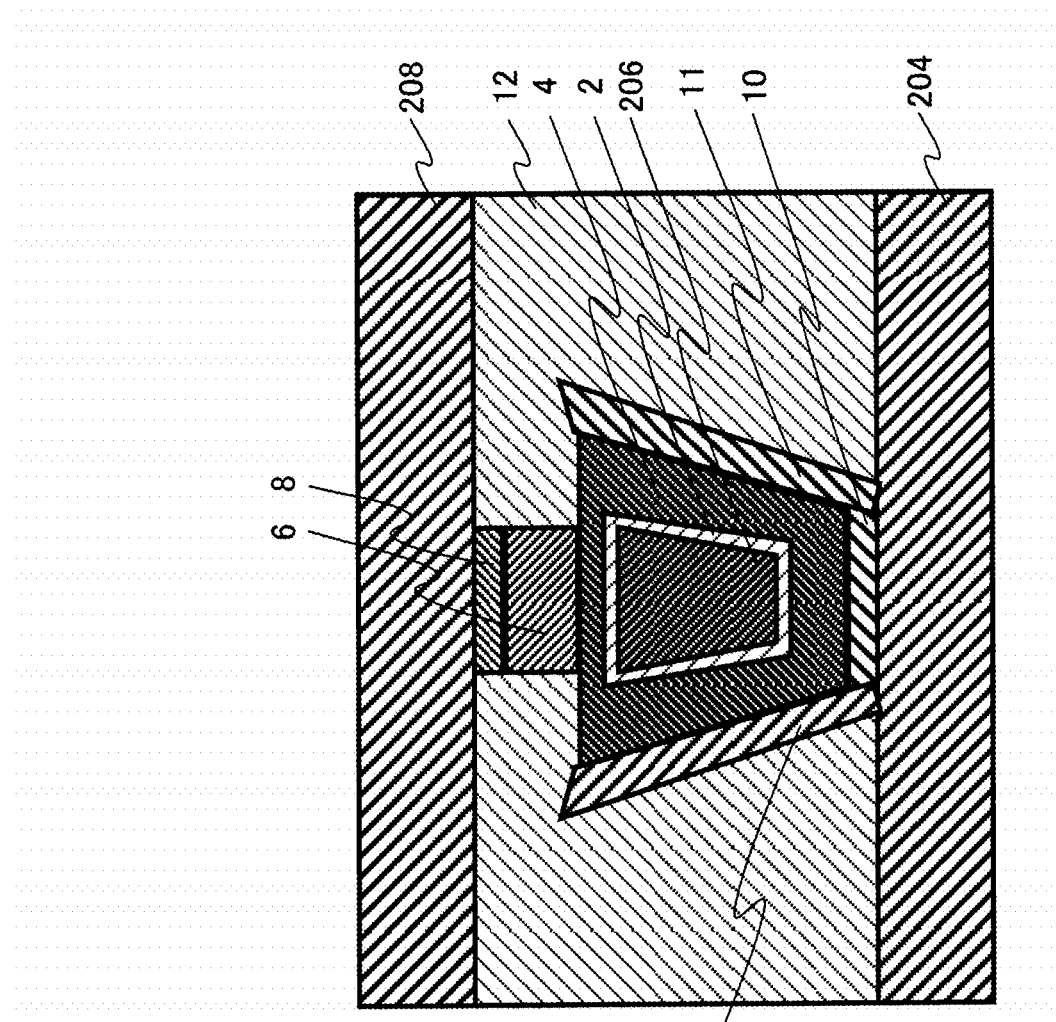
FIG. 18 is a schematic diagram of a magnetic recording head according to a sixth embodiment viewed from a disk facing surface.

FIG. 18 is a schematic diagram of the magnetic recording head 200 according to the sixth embodiment viewed from a disk facing surface 402. In the magnetic recording head 200 of the present embodiment, the driving current can further be reduced because the electrons are spin-polarized more strongly due to the pair of second spin injection layers 11.

The present embodiment can provide a magnetic recording head in which the long-term reliability of the spin torque oscillator is improved by reducing the driving current and a magnetic recording apparatus using the magnetic recording head.

Seventh Embodiment

Differently from the magnetic recording head of the sixth embodiment, a magnetic recording head of the present embodiment further includes side shields 216 disposed on both sides of a main magnetic pole 206 in a direction perpendicular to the moving direction of the magnetic recording head 200, and the side shields 216 are coupled with the leading shield 204 on the disk facing surface 402. Hereinafter, the descriptions of the points overlapping with the magnetic recording head 200 of the first to sixth embodiments will be omitted.

Figure 19:
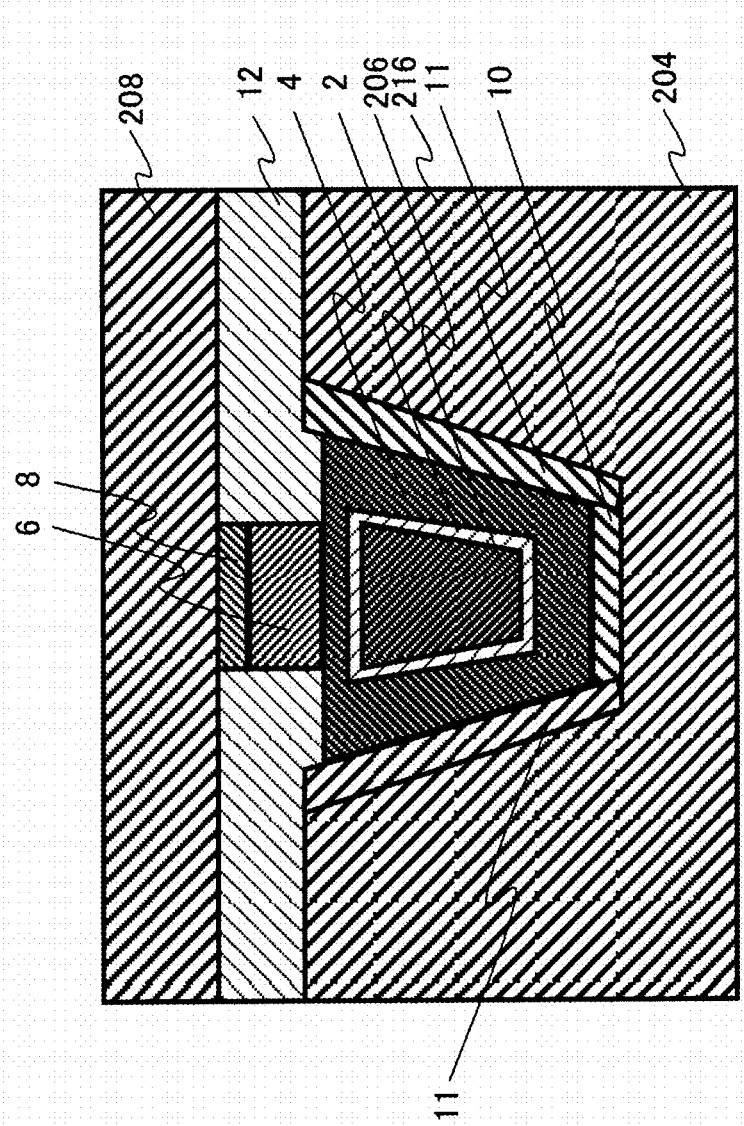
FIG. 19 is a schematic diagram of a magnetic recording head according to a seventh embodiment viewed from a disk facing surface.

FIG. 19 is a schematic diagram of the magnetic recording head 200 according to the seventh embodiment viewed from the disk facing surface 402. The magnetic recording head 200 of the present embodiment includes the side shields 216. This can improve the recording resolution in a track width direction. Furthermore, in the present embodiment, current flows in the side shields 216. This can supply current evenly to whole of a first spin injection layer 10 and second spin injection layers 11. It is noted that the leading shield 204 can be coupled with the side shields 216 on the disk facing surface 402 as described in the present embodiment.

The present embodiment can provide a magnetic recording head in which the long-term reliability of the spin torque oscillator is improved by reducing the driving current and the recording resolution in the track width direction is improved, and a magnetic recording apparatus using the magnetic recording head.

The magnetic recording head according to at least one of the embodiments described above includes an air bearing surface configured to face a magnetic recording medium, a main magnetic pole including a main magnetic pole distal end, the main magnetic pole being configured to apply a recording magnetic field to the magnetic recording medium, a first spin injection layer disposed on a leading side of the main magnetic pole, a field generation layer disposed on a trailing side of the main magnetic pole, and an intermediate layer configured to connect electrically the field generation layer to the first spin injection layer. This can provide a magnetic recording head in which the long-term reliability of the spin torque oscillator is improved by reducing the driving current.

While certain embodiments have been described, these embodiments have been presented by way of example only, and are not intended to limit the scope of the inventions. Indeed, the magnetic recording head and the magnetic recording apparatus described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

What is claimed is:

1. A magnetic recording head comprising:
   an air bearing surface configured to face a magnetic recording medium;
   a main magnetic pole including a main magnetic pole distal end, the main magnetic pole configured to apply a recording magnetic field to the magnetic recording medium;
   a first spin injection layer disposed on a leading side of the main magnetic pole;
   a field generation layer disposed on a trailing side of the main magnetic pole;
   an intermediate layer configured to connect electrically the field generation layer to the first spin injection layer; and
   a spin screening layer disposed between the main magnetic pole distal end and the intermediate layer.

2. The magnetic recording head according to claim 1, wherein a driving current is applied in a direction from the field generation layer to the first spin injection layer.

3. The magnetic recording head according to claim 1, wherein the main magnetic pole distal end is covered completely with the spin screening layer.

4. The magnetic recording head according to claim 1, wherein the spin screening layer has a thickness of 0.5 nm or more to 10 nm or less.

5. The magnetic recording head according to claim 1, wherein the spin screening layer includes an insulator.

6. The magnetic recording head according to claim 1, wherein the spin screening layer includes at least one metal selected from a group consisting of Zr, Nb, Mo, Pd, Hf, Pt, Ru, W, Ta, and Rh.

7. The magnetic recording head according to claim 1, further comprising:
   a leading shield disposed on the leading side and separately from the main magnetic pole, the leading shield being configured to return the recording magnetic field.

8. The magnetic recording head according to claim 1, further comprising:
   a plurality of side shields disposed on both sides of the main magnetic pole in a direction perpendicular to the moving direction of the magnetic recording head.

9. The magnetic recording head according to claim 1, further comprising:
a pair of second spin injection layers disposed on both sides of the main magnetic pole in a direction perpendicular to the moving direction of the magnetic recording head.

10. A magnetic recording apparatus comprising:
a magnetic recording medium;
a rotating unit configured to rotate the magnetic recording medium in a circumferential direction of the magnetic recording medium;
a magnetic recording head configured to record information in the magnetic recording medium, the magnetic recording head including
an air bearing surface configured to face a magnetic recording medium,
a main magnetic pole including a main magnetic pole distal end, the main magnetic pole configured to apply a recording magnetic field to the magnetic recording medium,
a first spin injection layer disposed on a leading side of the main magnetic pole,
a field generation layer disposed on a trailing side of the main magnetic pole,
an intermediate layer configured to connect electrically the field generation layer to the first spin injection layer, and
a spin screening layer disposed between the main magnetic pole distal end and the intermediate layer; and
a power source configured to apply the driving current in a direction from the field generation layer to the first spin injection layer.

11. A magnetic recording head comprising:
an air bearing surface configured to face a magnetic recording medium;
a main magnetic pole including a main magnetic pole distal end, the main magnetic pole configured to apply a recording magnetic field to the magnetic recording medium;
a first spin injection layer disposed on a leading side of the main magnetic pole;
a field generation layer disposed on a trailing side of the main magnetic pole;
an intermediate layer configured to connect electrically the field generation layer to the first spin injection layer;
a trailing shield disposed on the trailing side and separately from the main magnetic pole, the trailing shield configured to return the recording magnetic field, and wherein the field generation layer is disposed between the main magnetic pole and the trailing shield; and
a leading shield disposed on the leading side and separately from the main magnetic pole, the leading shield being configured to return the recording magnetic field, and wherein a length of the first spin injection layer in the plane parallel to the air bearing surface and perpendicular to a moving direction of the magnetic recording head is equal to or longer than a length of a part of the intermediate layer which is the nearest to the leading shield and in the direction perpendicular to the moving direction of the magnetic recording head, and equal to or less than a length of the trailing shield in the plane parallel to the air bearing surface and in the direction perpendicular to the moving direction of the magnetic recording head.

12. The magnetic recording head according to claim 11, further comprising:
a cap layer disposed on the trailing side of the field generation layer, the cap layer including a material identical to a material of the intermediate layer.

* * * * *